United States Patent Office 3,145,197
Patented Aug. 18, 1964

3,145,197
5-ACETAMIDO-N-ALKYL-2,4,6-TRIIODOISO-
PHTHALAMIC ACID COMPOUNDS
George Brooke Hoey, Ferguson, Mo., assignor to Mallinckrodt Chemical Works, St. Louis, Mo., a corporation of Missouri
No Drawing. Filed June 26, 1961, Ser. No. 119,287
6 Claims. (Cl. 260—211)

This invention relates to organic compounds and more particularly to certain novel isophthalic acid derivatives.

This application is a continuation-in-part of my application Serial Number 51,786, filed August 25, 1960, now abandoned.

Briefly, the present invention is directed to N-alkylisophthalamic acids of the general formula

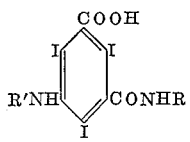

where R is a lower alkyl group and R' is an acyl group derived from a simple lower aliphatic monocarboxylic acid; and the pharmaceutically acceptable salts and lower alkyl esters thereof. The invention also includes methods of preparing the novel compounds of the class described.

Among the objects of the invention may be mentioned the provision of new isophthalic acid derivatives; the provision of new isophthalamic acid derivatives; the provision of new iodinated compounds; the provision of new 5-amino-2,4,6-triiodo-N-alkylisophthalamic acid derivatives; the provision of novel compounds which are useful intermediates for the preparation of new isophthalic acid derivatives; and the provision of compounds of the type indicated which are useful for the preparation of roentgenographic contrast media. Other objects of the invention include the provision of methods of preparing novel isophthalic acid derivatives of the type mentioned. Other objects and features will be in part apparent and in part pointed out hereinafter.

The invention accordingly comprises the products and methods hereinafter described, the scope of the invention being indicated in the following claims.

The present invention is directed to the novel N-alkyl-isophthalamic acids represented by the formula:

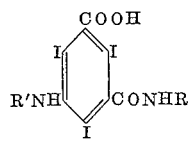

where R is a lower alkyl group and R' is an acyl group derived from a simple lower aliphatic monocarboxylic acid; and the pharmaceutically acceptable salts and lower alkyl esters thereof. The invention also includes methods of preparing the novel compounds of the class described.

5-nitroisophthalic acid is a convenient starting material for the preparation of the novel compounds of the invention. 5-nitroisophthalic acid may first be converted to the dialkyl ester, for example, the dimethyl or diethyl ester, by known methods. One of the ester groups is then selectively hydrolyzed by carefully treating a solution of the diester in a suitable solvent with one equivalent of strong base, such as sodium or potassium hydroxide. The solvent should preferably be one in which all the reactants are at least moderately soluble under the reaction conditions. Toluene and mixtures of methanol and acetone have been found suitable. Benzene and xylene, among others, may also be used for the purpose. The monoester may also be prepared directly from the acid.

Treatment of the monoester with a primary lower alkyl amine results in the formation of a 5-nitro-N-alkylisophthalamic acid. Reduction of the nitro group, by catalytic hydrogenation, for example, yields the corresponding 5-amino-N-alkylisophthalamic acid, which may be converted to the corresponding triiodo compound by iodination with a suitable agent, such as iodine monochloride or potassium iododichloride ($KICl_2$). Treatment of the iodinated amino compound with an acylating agent, such as (1) a lower acyl halide, or (2) a lower alkanoic acid anhydride in the presence of a catalyst such as sulfuric or perchloric acid, results in the formation of a 5-alkanamido-2,4,6-triiodo-N-alkylisophthalamic acid. The acylation reaction is usually carried out in a suitable inert solvent, such as dimethylacetamide or dimethylformamide, although in some cases an excess of the acylating agent serves as a suitable reaction medium. After hydrolysis of the excess acylating agent the alkanamido compound may be isolated and purified by known methods. Suitable salts and esters of the latter compounds are conveniently prepared by conventional means.

It will be recognized by those skilled in the art that variations in the methods outlined above may be employed in the preparation of various novel compounds of the invention.

For example, a 5-amino-N-alkylisophthalamic acid may be prepared by converting 5-aminoisophthalic acid to its dialkyl ester, forming the monoester by selective hydrolysis, and treating the monoester with an alkyl amine. The net effect thus accomplished is to reduce the nitro group to an amino group at an earlier stage of the synthesis.

Another variation is to form a 5-nitro-N-alkylisophthalamic acid by converting a monoester of 5-nitroisophthalic acid to the corresponding mono-acid halide (3-carbalkoxy-5-nitrobenzoyl halide) and reacting this acid halide with a primary amine.

Catalytic hydrogenation of the 5-nitro-N-alkylisophthalamic acid may be carried out on either the free acid, dissolved in a solvent such as a lower alcohol, or on a salt of the acid in aqueous solution. The nitro group may also be reduced by other reducing systems, such as metallic zinc in an aqueous solution of ammonium chloride.

Another variation that may be used is to treat a monoester of 5-aminoisophthalic acid with thionyl chloride, react the resulting 3-carbalkoxy-5-thonylaminobenzoyl chloride with a primary amine and hydrolyze the product to the corresponding 5-amino-N-alkylisophthalamic acid, which may then be iodinated and acylated as described above.

The 5 - alkanamido - 2,4,6 - triiodo-N-methylisophthalamic acids of the present invention are useful for the preparation of roentgenographic contrast media. For example, concentrated sterile aqueous solutions of the salts of these acids with non-toxic cations are of low toxicity and contain a high concentration of organically bound and substantially physiologically inert iodine which can be administered intravascularly.

The lower members of the series are excreted primarily by way of the urinary system. The sodium and methylglucamine salts are particularly useful for the preparation of solutions for intravascular injection for urography and for vasographic techniques, such as angiocardiography, arteriography, nephrography and venography.

Dispersons of water-insoluble derivatives of these acids, such as their esters, are also useful, as for example, in visualizing hollow organs and cavities having external orifices through which the contrast preparation can be introduced in preparation for the examination and removed after the examination is completed.

The compounds are also useful for the preparation of other types of contrast media such as for example, nonaqueous dispersions.

As is evident from the preceding description of the synthetic processes used in preparing the alkanamido compounds of the invention, the monoalkyl esters of 5-nitroisophthalic acid and the N-alkyl-5-nitroisophthalamic acids, as well as the 5-amino-N-alkylisophthalamic acids, both iodinated and uniodinated, are useful intermediates for the preparation of the 5-alkanamido-2,4,6-triiodo-N-alkyl-isophthalamic acids and other useful compounds.

The following examples illustrate the invention.

EXAMPLE 1

*5-Nitroisophthalic Acid, Monomethyl Ester (Monomethyl 5-Nitroisophthalate)*

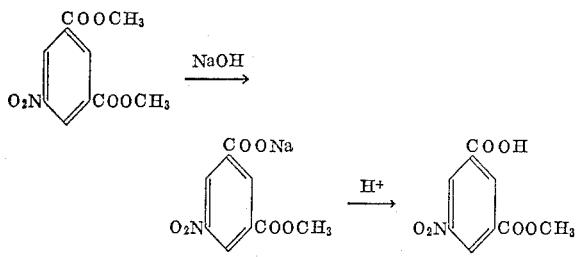

Normal aqueous sodium hydroxide (0.02 eq.) was added at room temperature with rapid swirling to a solution of 5-nitroisophthalic acid, dimethyl ester, (4.8 g., 0.02 mole) in acetone-methanol (100 ml. each). The clear solution immediately assumed a deep red-purple color which gradually lightened to a brown color over a 25-minute period. On standing overnight the solution lightened in color to a pale pink.

The solvent was evaporated, and the residue extracted with warm water (50 ml.). The residue of unsaponified diester (0.23 g., 4.2%; M.P. 115–117° C.) was filtered off, and the filtrate was acidified to precipitate the crude monomethyl ester of 5-nitroisophthalic acid. Yield 3.4 g. (75%). M.P. 170.5–175.5° C.

The preparation was repeated on a larger scale with certain variations. Methanolic potassium hydroxide was substituted for the aqueous sodium hydroxide, and acetone was used as the solvent for the 5-nitroisophthalic acid, dimethyl ester. Yield, 78%. M.P. 175–179° C. (corrected).

EXAMPLE 2

*N-Methyl-5-Nitroisophthalamic Acid [3-(Methylcarbamyl)-5-Nitrobenzoic Acid]*

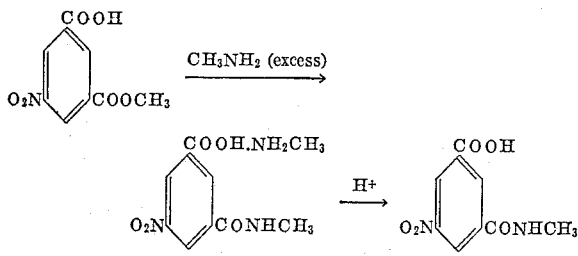

Crude 5-nitroisophthalic acid, monomethyl ester (46.3 g., 0.21 mole) was dissolved in 35% aqueous methylamine solution (500 ml.). On standing, the orange solution became blood red. The reaction mixture was evaporated overnight on the steam bath, the cool residue was treated with 50 ml. of water and the solution was acidified with hydrochloric acid. A yellow precipitate of crude N-methyl-5-nitroisophthalamic acid was separated and dried. (Neutral equivalent 216; yield 41.5 g.) This acid was redissolved in dilute ammonia solution and the resulting solution (pH 5.2) was treated with charcoal. Acidification of the treated solution yieldable a pale yellow product of neutral equivalent 213. A small portion (10 g.) was recrystallized from 1:1 water-ethanol (300 ml.) to yield orange N-methyl-5-nitroisophthalamic acid.

M.P. 251–252.5° C. Calculated for $C_9H_8N_2O_5$: N, 12.5%; Neutral Equivalent, 224. Found: N, 12.3%; Neutral Equivalent, 222.

EXAMPLE 3

*5-Amino-N-Methylisophthalamic Acid [5-Amino-3-(Methylcarbamyl)-Benzoic Acid]*

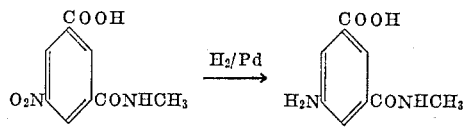

Crude N-methyl-5-nitrosophthalamic acid (neutral equivalent 216; 11.2 g., 0.05 mole) was reduced with hydrogen in a low pressure hydrogenator. The solvent was anhydrous methanol (250 ml.) and the catalyst was 5% palladium on charcoal slurried in 10 ml. of water. After the theoretical quantity of hydrogen for reduction of the nitro group had been absorbed the solution was filtered to remove the catalyst and the solvent was evaporated under reduced pressure, leaving a white residue of crude 5-amino-N-methylisophthalamic acid. M.P. 227–230° C. (corrected).

EXAMPLE 4

*5-Amino - 2,4,6 - Triiodo - N - Methylisophthalamic Acid [5 - Amino-2,4,6-Triiodo-3-(Methylcarbamyl)- Benzoic Acid]*

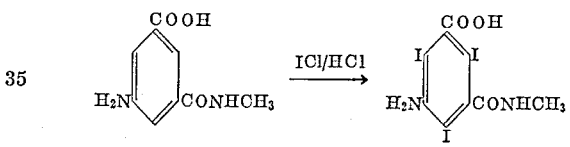

The crude 5-amino-N-methylisophthalamic acid from Example 3 was dissolved in hydrochloric acid (100 ml. concentrated acid and 100 ml. of water) and this solution was diluted to 1 liter with water. Iodine monochloride (27.4 g. of 95% ICl, 0.16 mole) in concentrated hydrochloric acid (30 ml.) was added in one portion to the stirred solution maintained at 54° C. The solution was heated on a steam bath. After 2 hours the solution was diluted to 1½ liters and after 3 hours titration of an aliquot indicated that 50% of the iodine monochloride had been consumed.

Precipitation of a solid began after 3¾ hours of reaction (75° C.). Intermittent heating and stirring were continued for 4 days, 10 g. of 95% iodine monochloride being added during the third day. After 4 days, titration of an aliquot indicated that 96% of the theoretical quantity of iodine monochloride had been consumed. The precipitated solid was filtered off, washed with water and dried at 75° C. under reduced pressure. Yield of 5 - amino - 2,4,6 - triiodo - N - methylisophthalamic acid, 20.6 g. M.P. 266–268° C. (dec.). Calculated for $C_9H_7I_3N_2O_3$: Neutral Equivalent, 572. Found: Neutral Equivalent, 568.

EXAMPLE 5

1.95 molar $KICl_2$ solution (1144 ml., 2.22 moles) was added during ½ hour to a stirred suspension of 5-amino-N-methylisophthalamic acid (196 g., 1.01 moles) in 2.5 liters of water. After three hours of additional stirring, a solution of sodium hydroxide (88 g., 2.2 moles of NaOH in 200 ml. of water) was added. Then, additional 1.95 Molar $KICl_2$ solution (522 ml., 1.01 mole) was added during ½ hour. The reaction mixture was stirred overnight after which the crude product was collected and purified by conversion first to the ammonium salt, then to the free acid. Yield of 5-amino-2,4,6-triiodo-N-methylisophthalamic acid, 310 g. (53.6%).

EXAMPLE 6

*5 - Acetamido-2,4,6-Triiodo-N-Methylisophthalamic Acid [5-Acetamido - 2,4,6 - Triiodo - 3 - (Methylcarbamyl)-Benzoic Acid]*

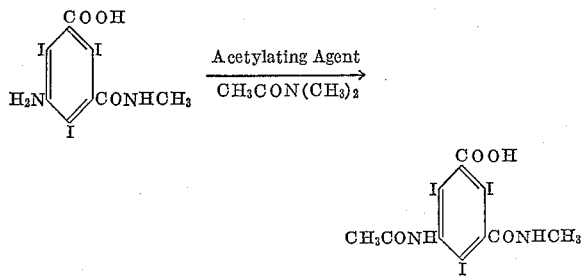

Crude 5 - amino - 2,4,6 - triiodo - N - methylisophthalamic acid (21.0 g.) was dissolved in warm dimethylacetamide (40 ml.), and acetic anhydride (30 ml.) and concentrated sulfuric acid (2 drops) were added. This solution was heated on the steam bath for 2 hours, then heated at 110° C. for 5 minutes, then cooled. Water and ammonium hydroxide were added to destroy the excess acetic anhydride, after which the mixture was evaporated to a volume of 50 ml. The cooled solution was acidified with concentrated hydrochloric acid and a tan solid was collected. The crude product was dissolved in 100 ml. of water containing a slight excess of sodium hydroxide. The pH was adjusted to 4.5 with acetic acid, and the solution was treated with charcoal. The colorless solution was acidified with concentrated hydrochloric acid and cooled, and the precipitate was filtered off and dried under reduced pressure. The resulting 5 - acetamido - 2,4,6 - triiodo - N - methylisophthalamic acid decomposes about 285° C. and does not melt below 300° C. Calculated for $C_{11}H_9I_3N_2O_4$: I, 62.0%; Neutral Equivalent, 614. Found: I, 60.0%; Neutral Equivalent, 607.

EXAMPLE 7

Acetyl chloride (17 ml., 0.24 mole) was added in portions during 10 minutes to a stirred slurry of 5-amino-2,4,6-triiodo-N-methylisophthalamic acid (57.2 g., 0.1 mole) in dimethylacetamide (120 ml.). Solution occurred in ½–1 hour, and after a total of 1½ hours 20 ml. of water was added and the reaction mixture was evaporated to a thick slurry. The product was purified by twice dissolving it as a sodium salt and precipitating the free acid by the addition of mineral acid. The resulting nearly colorless 5 - acetamido - 2,4,6 - triiodo - N-methylisophthalamic acid decomposed at about 285° C. but did not melt below 300° C. Yield, 47 g. (76.5%). Calculated for $C_{11}H_9I_3N_2O_4$: I, 62.0%; Neutral Equivalent, 614. Found: I, 61.8%; Neutral Equivalent, 619.

EXAMPLE 8

*5-Acetamido-2,4,6-Triiodo-N-Methylisophthalamic Acid, Sodium Salt*

5 - acetamido - 2,4,6 - triiodo - N - methylisophthalamic acid was slurried in water and dissolved by the addition of an equivalent quantity of sodium hydroxide. The solution was evaporated to dryness to yield the sodium salt of 5 - acetamido - 2,4,6 - triiodo - N - methylisophthalamic acid. Its solubility in water at 25° C. is approximately 85 g. per 100 ml. of solution.

The acute intravenous $LD_{50}$ of this salt in male albino mice is approximately 19.2 g./kg.

Intravenous administration of a solution of this salt produces X-ray visualization of the kidneys of the dog which is comparable to that produced by sodium diatrizoate.

EXAMPLE 9

*5-Acetamido-2,4,6-Triiodo-N-Methylisophthalamic Acid, N-Methylglucamine Salt*

The N-methylglucamine salt of 5-acetamido-2,4,6-triiodo-N-methylisophthalamic acid is prepared by a process generally similar to that described in Example 8, an equivalent quantity of N-methylglucamine being substituted for the sodium hydroxide there specified.

Intravenous administration of a solution of this salt to a dog yields good X-ray visualization of the kidneys.

EXAMPLE 10

*N-Ethyl-5-Nitroisophthalamic Acid*

5-nitroisophthalic acid, monomethyl ester (56 g., 0.23 mole) was added to a 70% solution of ethylamine (250 ml.). The solution was set aside for one hour, heated ½ hour on a steam bath, and then concentrated to a volume of about 100 ml. An equal volume of water was added, the acidity adjusted to pH 4–5, and the solution treated with decolorizing charcoal and filtered. When the solution was made acid to Congo red, an oil separated which soon crystallized. The crude product was recrystallized from 50% acetone (200 ml.). The first crop of recrystallized N-ethyl-5-nitroisophthalamic acid amounted to 30 g. Melting point, 206–208° C. Calculated for $C_{10}H_{10}N_2O_5$: Neutral Equivalent, 238.2. Found: Neutral Equivalent, 238. The infra-red spectrum of the product was consistent with that to be expected for N-ethyl-5-nitroisophthalamic acid. A second crop of 14 g. was obtained by concentration of the mother liquor. Total yield, 44 g. (80%).

EXAMPLE 11

*5-Amino-N-Ethylisophthalamic Acid*

N-ethyl-5-nitroisophthalamic acid (41.7 g., 0.175 mole), in methanol solution, was hydrogenated under pressure using a Pd/C catalyst. After the theoretical quantity of hydrogen had been absorbed, the catalyst was filtered off and the solution evaporated to dryness. The brown residue of crude 5-amino-N-ethylisophthalamic acid was dried at 120° C. Yield 35.6 g. (97.8%).

EXAMPLE 12

*5-Amino-N-Ethyl-2,4,6-Triiodoisophthalamic Acid*

Potassium iodoichloride solution (193 ml. of 2 M $KICl_2$) was added over a period of one hour to a stirred aqueous suspension (875 ml.) of 5-amino-N-ethylisophthalamic acid (35.6 g., 0.17 mole) from Example 11. The mixture was stirred for an additional three hours, after which a solution of sodium hydroxide (13.7 g., 0.34 mole NaOH, in 60 ml. of water) was added. This was followed by additional 2 M $KICl_2$ (87.5 ml., 0.175 mole) during ½ hour. Stirring was continued overnight, after which the mixture was chilled and the separated product collected. The product was dissolved in water (400 ml.) containing a slight excess of sodium hydroxide, and the solution was acidified (pH 5) and treated with sodium bisulfite to remove excess iodine. The hot solution was treated with decolorizing charcoal, filtered and slowly added with stirring to a hot hydrochloric acid solution (21 ml. concentrated acid diluted with 80 ml. of water). The mixture was chilled overnight, after which the product was collected, washed,, and dried at 115° C. The crude product weighed 75.3 g. and had a neutral equivalent of 556. This crude product was redissolved as its sodium salt and reprecipitated as the free acid. Yield of 5-amino-N-ethyl-2,4,6-triiodoisophthalamic acid: 61.6 g. (61%). Melting point, 242.5–244.5° C. (corrected) with decomposition. Calculated for $C_{10}H_9N_2O_3I_3$: Neutral Equivalent, 585.9. Found: Neutral Equivalent, 578.

EXAMPLE 13

*5-Acetamido-N-Ethyl-2,4,6-Triiodoisophthalamic Acid*

Acetyl chloride (18 ml., 0.25 mole) was added to a stirred solution of 5-amino-N-ethyl-2,4,6-triiodoisophthalamic acid (61.6 g., 0.105 mole) in dimethylacetamide (120 ml.). The solution was stirred 1½ hours, then concentrated on the steam bath to a sludge. This sludge was dissolved in water (250 ml.) with enough sodium hydroxide to complete solution. Concentrated ammonium hydroxide (20 ml.) was added, and the solution was digested ½ hour on a steam bath. The solution was made slightly acid (pH 5), treated with decolorizing charcoal, and filtered. The dark red filtrate was slowly added to a hot stirred solution of hydrochloric acid (15 ml. of concentrated acid diluted with 85 ml. of water). The mixture was chilled and the crude 5-acetamido-N-ethyl-2,4,6-triiodoisophthalamic acid collected. This crude product was further purified by reprecipitation from a solution of its sodium salt. Yield of 5-acetamido-N-ethyl-2,4,6-triiodoisophthalamic acid: 48.5 g. (74%). Calculated for $C_{12}H_{11}N_2O_4I_3$: Neutral Equivalent, 628; Iodine, 60.7%. Found: Neutral Equivalent, 623; Iodine 60.5%.

EXAMPLE 14

*5-Acetamido-N-Ethyl-2,4,6-Triiodoisophthalamic Acid, Sodium Salt*

The sodium salt of 5-acetamido-N-ethyl-2,4,6-triiodoisophthalamic acid was prepared from the free acid by conventional means. The solubility of this salt in water at 25° C. is greater than 80 g. per 100 ml. of solution.

When administered intravenously in the form of a 51% (w./v.) solution containing 300 mg. I/ml., the acute $LD_{50}$ in albino mice was found to be approximately 19.8 g./kg.

EXAMPLE 15

*5-Propionamido-2,4,6-Triiodo-N-Methylisophthalamic Acid*

Propionyl chloride (90 ml., 1.03 mole) was added to a stirred suspension of 5-amino-2,4,6-triiodo-N-methylisophthalamic acid (200 g., 0.35 mole) in dimethylacetamide (425 ml.). The mixture was heated to 75° C. and held at that temperature for 1½ hours. During this time considerable product separated. Water (400 ml.) was added, and the mixture was chilled and the crude product collected.

The crude product was dissolved in water (1 liter) containing a slight excess of sodium hydroxide. Concentrated ammonium hydroxide (20 ml.) was added, and the solution was heated 15 minutes on a steam bath. The solution was made slightly acid (pH 5) by the addition of acetic acid, treated with decolorizing charcoal and filtered. The colorless filtrate was slowly added to a hot solution of hydrochloric acid (40 ml. concentrated acid diluted with 80 ml. of water). The crude 5-propionamido-2,4,6-triiodo-N-methylisophthalamic acid was collected and further purified by reprecipitation from a solution of its sodium salt. Yield, 167 g. Melting point, 300.1–301.1° C. (corrected) with decomposition. Calculated for $C_{12}H_{11}N_2O_4I_3$: Neutral Equivalent, 628; Iodine, 60.7%. Found: Neutral Equivalent, 627; Iodine, 60.6%.

EXAMPLE 16

*5-Propionamido-2,4,6-Triiodo-N-Methylisophthalamic Acid, Sodium Salt*

The sodium salt of 5-propionamido-2,4,6-triiodo-N-methylisophthalamic acid was prepared from the free acid by conventional means. Its solubility in water at 25° C. is approximately 43% (w./v.).

EXAMPLE 17

*5-Propionamido-2,4,6-Triiodo-N-Methylisophthalamic Acid, N-Methylglucamine Salt*

The N-methylglucamine salt of 5-propionamido-2,4,6-triiodo-N-methylisophthalamic acid was prepared by conventional means. It is highly soluble in water.

The acute $LD_{50}$ of this salt in albino mice, obtained by intravenous administration of a 65% (w./v.) solution containing 300 mg. I/ml., is approximately 18.6 g./kg.

EXAMPLE 18

*5-Butyramido-2,4,6-Triiodo-N-Methylisophthalamic Acid* n-Butyrylchloride (100 ml., 0.965 mole) was added to a stirred mixture of dimethylacetamide (500 ml.) and 5-amino-2,4,6-triiodo-N-methylisophthalamic acid (200 g., 0.35 mole). The mixture was heated at 90° C. for 1 hour, then poured into 200 ml. of water and allowed to stand overnight. This solution was concentrated to a volume of about 200 ml., then diluted again to a volume of about 750 ml. When this solution was chilled an oily gum separated and was isolated by decanting the mother liquor. This oil was dissolved in water (1½ liters) with sufficient sodium hydroxide to complete solution. Concentrated ammonium hydroxide (50 ml.) was added, and the solution was heated ½ hour on a steam bath. A slight excess of acetic acid was added (pH 5) and the solution was treated with decolorizing charcoal and filtered. The product was precipitated by slowly adding this solution to a stirred solution of hydrochloric acid (40 ml. concentrated acid diluted with 100 ml. of water). The crystalline product (79.5 g.) was further purified by reprecipitation from a solution of its sodium salt. Yield of 5 - butyramido-2,4,6-triiodo - N - methylisophthalamic acid, 72.5 g. Melting point, 292.6–293.6° C. (corrected) with decomposition. Calculated for $C_{13}H_{13}N_2O_4I_3$: Neutral Equivalent, 642; Iodine, 59.3%. Found: Neutral Equivalent, 646; Iodine, 59.1%.

EXAMPLE 19

*5-Butyramido-2,4,6-Triiodo-N-Methylisophthalamic Acid, Sodium Salt*

The sodium salt of 5-butyramido-2,4,6-triiodo-N-methylisophthalamic acid was prepared by conventional means. Its solubility in water at 25° C. is approximately 54% (w./v.).

EXAMPLE 20

*5-Butyramido-2,4,6-Triiodo-N-Methylisophthalamic Acid, N-Methylglucamine Salt*

The N-methylglucamine salt of 5-butyramido-2,4,6-triiodo-N-methylisophthalamic acid was prepared by conventional means. It is highly soluble in water.

The acute intravenous $LD_{50}$ of this salt in albino mice was obtained by administration of a 66% (w./v.) solution, containing 300 mg. I/ml. The $LD_{50}$ is approximately 17.8 g./kg.

EXAMPLE 21

*5-Acetamido-2,4,6-Triiodo-N-Methylisophthalamic Acid, Methyl Ester*

A solution of potassium hydroxide (22 g., 0.33 mole) in absolute alcohol (500 ml.) was added to a stirred slurry of 5-acetamido-2,4,6-triiodo-N-methylisophthalamic acid (205 g., 0.33 mole) in absolute alcohol (500 ml.). Only a small amount of undissolved matter remained. Dimethyl sulfate (35 ml., 0.33 mole) was added to this solution and after 2 hours stirring the product began to crystallize. Stirring was continued for another hour, after which water (500 ml.) was added and the crystals collected. The mother liquor was evaporated to dryness and the residue combined with the previously collected crystals. The combined solids were stirred into 800 ml. water containing a slight excess of sodium hydroxide. The solution was acidified slightly (pH 5) and the undissolved ester collected.

The ester was digested with dimethylformamide (400 ml.) at 90° C. and the mixture was filtered. The residue (A) was reserved and hot water (400 ml.) was added to the filtrate. The mixture was digested for a short time, then chilled, and the product was collected, washed with water and dried at 110° C. Yield, 79 g. Melting point, 287.5–288° C. (corrected) with decomposition.

The portion of the crude product (A) that did not dissolve in the 400 ml. of hot dimethylformamide was now dissolved in an additional quantity of hot dimethylformamide (250 ml.). This solution was filtered and hot water (250 ml.) was added to the filtrate. The mixture was digested a short time, then chilled, and the product was collected, washed with water and dried at 110° C. Yield, 38.5 g. Melting point, 295.0–295.5° C. (corrected) with decomposition. Calculated for $$C_{12}H_{11}N_2O_4I_3$$

Iodine, 60.6%. Found: Iodine, 60.3%.

EXAMPLE 22

*5-Acetamido-2,4,6-Triiodo-N-Methylisophthalamic Acid, Ethyl Ester*

The ethyl ester of 5-acetamido-2,4,6-triiodo-N-methylisophthalamic acid was prepared by the same general procedure and on the same scale as that described in Example 21 for the methyl ester. Diethyl sulfate (45 ml., 0.33 mole) was used as the ethylating agent. During the 2 hour period of stirring the solution became progressively thicker, then suddenly set solid with crystals. The mixture was allowed to stand overnight after which the solid was separated and the filtrate evaporated to dryness. The resulting residue was combined with the previously collected solids and digested 15 minutes on a steam bath with water (800 ml.) containing a slight excess of sodium hydroxide. The mixture was then acidified slightly (pH 5) and chilled. The solids were collected and dissolved in hot (90° C.) dimethylformamide (400 ml.). The solution was filtered, and hot water (400 ml.) was added. The resulting mixture was digested 1 hour on a steam bath, then chilled. The separated ethyl 5-acetamido-2,4,6-triiodo - N - methylisophthalamate was collected, washed with water and dried at 110° C. Yield, 102 g. (48%). Melting point, 297.5–298.0° C. (corrected) with decomposition. Calculated for $C_{13}H_{13}N_2O_4I_3$: Iodine, 59.3%; nitrogen 4.36%. Found: Iodine 59.3%; nitrogen, 4.30%.

EXAMPLE 23

A solution having an iodine content of 30% (w./v.), suitable for intravenous urography, was prepared. It contained 5-acetamido-2,4,6-triiodo - N - methylisophthalamic
  acid, N-methylglucamine salt _____ g __ 63.7
Sodium dihydrogen phosphate (buffer) _____ mg __ 15
Calcium disodium ethylenediaminetetraacetate (stabilizer) _____ mg __ 11
Water, to make 100 ml.

EXAMPLE 24

A solution having an iodine content of 30% (w./v.), suitable for intravenous urography, was prepared. It contained.

5-acetamido-2,4,6-triiodo-N-methylisophthalamic acid,
  sodium salt _____ g __ 50
Sodium dihydrogen phosphate _____ mg __ 15
Calcium disodium ethylenediaminetetraacetate __ mg __ 9
Water, to make 100 ml.

When used clinically for intravenous urography the above solution produced a high proportion of films of good quality with a low incidence of side effects.

EXAMPLE 25

A solution having an iodine content of 48% (w./v.), suitable for angiocardiography, was prepared. It contained 5-acetamido-2,4,6-triiodo - N - methylisophthalamic
  acid, sodium salt _____ g __ 80
Sodium dihydrogen phosphate _____ mg __ 15
Calcium disodium ethylenediaminetetraacetate
                                            mg __ 13.5
Water, to make 100 ml.

This solution had an absolute viscosity of 14.4 centipoises at 25° C. and 8.4 centipoises at 37.5° C.

EXAMPLE 26

*3-Chloroformyl-5-Nitrobenzoic Acid, Methyl Ester (3-Carbomethoxy-5-Nitrobenzoyl Chloride)*

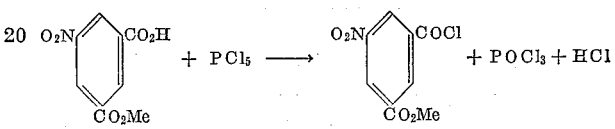

5-nitroisophthalic acid, monomethyl ester (241 g., 1.07 mole) and phosphorus pentachloride, (230 g., 1.07 mole) were mixed in toluene (100 ml.). The reaction proceeded slowly for 17.5 hours, after which heat was applied to complete the reaction in an additional 45 minutes. The toluene was evaporated under reduced pressure and the crude 3-chloroformyl-5-nitrobenzoic acid, methyl ester crystallized. Carbon tetrachloride was then added and evaporated under reduced pressure to complete removal of the by-products. Melting point, 72.4–74° C. (corrected). Neutral Equivalent (determined by hydrolyzing the chloroformyl group and titrating the liberated hydrochloric acid), 238. Calculated for $C_9H_6ClNO_5$: Neutral Equivalent, 243.

EXAMPLE 27

*N-n-Amyl-5-Nitroisophthalamic Acid, Methyl Ester*

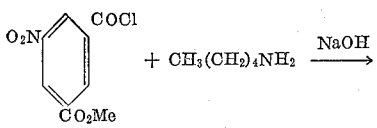

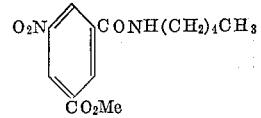

A solution of 3-chloroformyl-5-nitrobenzoic acid, methyl ester (55.6 g., 0.229 mole) in carbon tetrachloride (271 g.) was added slowly to a stirred mixture of n-amylamine (19.9 g., 0.229 mole), water (200 ml.), acetone (50 ml.), and sodium hydroxide (9.2 g.). The reaction mixture was kept alkaline at all times. When addition of the ester had been completed an air jet was directed at the surface of the reaction mixture to evaporate the carbon tetrachloride and acetone. An oily precipitate began to form within a half hour. The mixture was stirred under the air jet for 2.5 hours, then cooled in an ice bath, and the aqueous layer was decanted from the oily product. This crude N-n-amyl-5-nitroisophthalamic acid, methyl ester was utilized in the following example without further purification.

EXAMPLE 28

*N-n-Amyl-5-Nitroisophthalamic Acid*

The crude methyl ester of N-n-amyl-5-nitroisophthalamic acid prepared in Example 27 was dissolved in the minimum amount of anhydrous denatured alcohol (Treasury Department Formula SDA 2B) and an equal volume of water. Sodium carbonate was added (pH 8) and the mixture was heated for a half hour and allowed to stand over the week-end. Precipitation occurred during this period. The mixture was diluted with water and heated, whereupon most of the precipitate dissolved. The undissolved matter was filtered off and the filtrate was poured into an excess of dilute hydrochloric acid. The resulting precipitate was filtered off, slurried in water and dissolved by neutralization with dilute sodium hydroxide solution. This solution was treated with decolorizing charcoal and filtered and the product was precipitated by adding dilute hydrochloric acid. The product, N-n-amyl-5-nitroisophthalamic acid, was filtered off and dried at 110° C. Calculated for $C_{13}N_{16}N_2O_5$: Neutral Equivalent, 280. Found: Neutral Equivalent, 286. This product was hydrogenated in the next example without further purification.

EXAMPLE 29

*5-Amino-N-n-Amylisophthalamic Acid*

N-n-amyl-5-nitroisophthalamic acid (57.7 g., 0.205 mole) was slurried in water and dissolved by neutralization (pH 6) with dilute sodium hydroxide solution. The solution was heated, catalyst (10 g. of 5% palladium-on-charcoal) was added, and hydrogen was introduced under pressure. After hydrogenation was complete, the catalyst was filtered off and the solution was used in the next example without isolation of the 5-amino-N-n-amylisophthalamic acid so formed.

EXAMPLE 30

*5-Amino-N-n-Amyl-2,4,6-Triiodoisophthalamic Acid*

The aqueous solution of the sodium salt of 5-amino-N-n-amylisophthalamic acid (0.205 mole) from Example 29 was mixed with concentrated hydrochloric acid (45 ml.) and a solution of iodine monochloride (71.5 g., 0.42 mole of 95% ICl in 70 ml. of concentrated hydrochloric acid) was added slowly with constant stirring. The reaction mixture was heated at 75° C. for 19 hours and cooled in an ice bath and the crude product filtered off. The product was slurried in water and dissolved by neutralization (pH 6) with dilute sodium hydroxide solution. The solution was treated twice with decolorizing charcoal, and the filtrate from the charcoal treatment was poured into an excess of dilute hydrochloric acid. The precipitate of 5-amino-N-n-amyl-2,4,6-triiodoisophthalamic acid was filtered off and dried at 110° C. Calculated for $$C_{13}H_{15}I_3N_2O_3$$

Neutral Equivalent, 628; iodine, 60.65%. Found: Neutral Equivalent, 622; iodine, 59.4%.

EXAMPLE 31

*5-Acetamido-N-n-Amyl-2,4,6-Triiodoisophthalamic Acid*

5-amino-N-n-amyl-2,4,6-triiodoisophthalamic acid (4.0 g., 0.0064 mole) was mixed with acetic anhydride (15 ml.) and concentrated sulfuric acid (2 drops). The milk-white mixture was heated on a steam bath for a half hour, cooled, and poured slowly ino a larger volume of water (150 ml.). The mixture was acidified strongly with concentrated hydrochloric acid and evaporated to dryness. The residue was slurried in water and dissolved by neutralization (pH 6) with sodium hydroxide. The solution was treated with decolorizing charcoal and filtered, and the filtrate was poured into an excess of dilute hydrochloric acid. The precipitated 5-acetamido-N-n-amyl-2,4,6-triiodoisophthalamic acid was filtered off and dried at 110° C. Calculated for $C_{15}H_{16}I_3N_2O_4$: Neutral equivalent, 669, iodine 56.9%. Found: Neutral equivalent, 672; iodine, 56.0%.

EXAMPLE 32

*5-Caproamido-2,4,6-Triiodo-N-Methylisophthalamic Acid*

A mixture of 5-amino-2,4,6-triiodo-N-methylisophthalamic acid (114 g., 0.2 mole), caproyl chloride (42 ml., 0.3 mole) and N,N-dimethylacetamide (200 ml.) was heated on a steam bath with occasional stirring for 30 minutes. The resulting solution was poured into a large volume of hot water (2 liters) and the mixture was digested 15 minutes on a steam bath. The mixture was chilled to 10° C. and the crude product collected and washed with water. It was purified by twice precipitating the acid from a solution of its sodium salt. Yield of 5-caproamido-2,4,6-triiodo-N-methylisophthalamic acid, 116.5 g. (87% of theory). Melting point, 275° C. (corrected) (with decomposition). Calculated for $$C_{15}H_{17}I_3N_2O_4$$

Neutral Equivalent, 670; iodine, 56.8%. Found: Neutral Equivalent, 668; iodine 56.6%.

EXAMPLE 33

*N-Amyl-5-Butyramido-2,4,6-Triiodoisophthalamic Acid* n-Butyryl chloride (7.5 ml., 0.074 mole) was added to a stirred mixture of 5-amino-N-amyl-2,4,6-triiodoisophthalamic acid (30.5 g., 0.049 mole) in N,N-dimethylacetamide (60 ml.). The solution was heated to 100° C. then set aside until the temperature had dropped to 65° C. whereupon water (200 ml.) was added and the mixture chilled. The resulting gum was dissolved in water (about 300 ml.) with the aid of a slight excess of sodium hydroxide. The solution was slightly acidified (pH 5) with acetic acid, treated with decolorizing charcoal and filtered. The product was precipitated by adding an excess of hydrochloric acid and was further purified by a double precipitation from a solution of the sodium salt. This partially purified product was digested with hot alcohol (80 ml.) and the undissolved N-amyl-5-butyramido-2,4,6-triiodoisophthalamic acid filtered off. Yield, 11.5 g. Melting point 301–303° C. (corrected). Calculated for $C_{17}H_{21}I_3N_2O_4$: Neutral Equivalent, 698; iodine, 54.6%. Found: Neutral Equivalent, 695; iodine, 54.1%.

The alcoholic mother liquor was diluted with an equal volume of water, whereupon a second crop was obtained by cooling the mixture. The yield was 5.0 g. of a product of Neutral Equivalent 685.

Among the major criteria used in the evaluation of iodinated compounds proposed for use in aqueous contrast media solutions are radiopacity and systemic and local tissue toxicity. By these criteria the preferred compounds of the present invention are superior to the preferred compounds of the prior art. This is clear from the following comparison.

It is now generally recognized in the X-ray contrast media art that the best available water-soluble contrast agents are the sodium and N-methyl-glucamine salts of two homologous compounds, 3,5-bisacetamido-2,4,6-triiodobenzoic acid and 3,5-bispropionamido-2,4,6-triiodobenzoic acid. For the present purpose, these two compounds may be considered to be substantially equivalent. Therefore, for simplicity the bisacetamido compound will be selected for comparison. This compound is also known as diatrizoic acid and its salts are diatrizoates. Comparison may best be made between diatrizoic acid, representing the prior art, and 5-acetamido-2,4,6-triiodo-N-methylisophthalamic acid, representing the compounds of this invention.

The radiopacity of a contrast medium depends upon the iodine content of the radiopaque agent and its concentration in the medium. The maximum concentration achievable is of course limited by the solubility of the agent. In Table 1 the properties of these two agents which affect radiopacity are compared.

TABLE 1

| Radiopaque Agent | Iodine Percent | Solubility of Sodium Salt in Water at 25° C. (Percent w./v.) |
|---|---|---|
| Diatrizoic Acid | 62.0 | 55 |
| 5-Acetamido-2,4,6-triiodo-N-methylisophthalamic acid | 62.0 | Approx. 85 |

The acute intravenous $LD_{50}$ in laboratory animals is commonly used as a basis for evaluating the systemic toxicity of radiopaque agents. Comparative data for these two agents are presented in Table 2.

TABLE 2

| Radiopaque agent: | Acute intravenous $LD_{50}$ in mice (g./kg.) |
|---|---|
| Sodium diatrizoate | [1] 14.0 |
| 5-acetamido-2,4,6-triiodo-N-methylisophthalamic acid, sodium salt | 19.2 |

[1] Hoppe, Annals N.Y. Acad. Sci., vol. 78, p. 729 (July 2, 1959).

Damage to the blood brain barrier in laboratory animals has been suggested as a meaningful index of local tissue toxicity. When tested by a modification of the technique described by Whiteleather and De Saussure (Radiology, 67:537–43, October 1956), the effect of the sodium salt of 5-acetamido-2,4,6-triiodo-N-methylisophthalamic acid on the blood brain barrier of the dog compared favorably with that of sodium diatrizoate.

In other respects also, the pharmacological effects of the 5-acetamido-2,4,6-triiodo-N-methylisophthalamic acid of the invention in laboratory animals compared favorably with those of diatrizoic acid.

It will be understood that in addition to the compounds specifically disclosed in the above examples, other compounds may be prepared by the same general methods. For example other mono-lower alkyl esters, such as the monoethyl and monopropyl esters, of 5-nitroisophthalic acid, may be prepared by the general method outlined in Example 1 by the substitution of the diethyl or dipropyl esters, respectively, of 5-nitroisophthalic acid, in place of the dimethyl ester specified as the starting material in Example 1. Similarly, other N-lower alkyl-5-nitroisophthalamic acids may be prepared by the method of Example 2. For example, the use of propylamine in place of the methylamine specified in Example 2 leads to the preparation of N-propyl-5-nitroisophthalamic acid. Reduction of other N-lower alkyl-5-nitroisophthalamic acids, such as the N-propyl compound referred to above, results in the formation of the corresponding 5-amino-N-alkylisophthalamic acids, such as 5-amino-N-propylisophthalamic acid. Iodination of the above compound yields 5-amino-2,4,6-triiodo-N-propylisophthalamic acid.

A variety of 5-lower alkanamido-2,4,6-triiodo-N-lower alkylisophthalamic acids may be prepared by acylation of various 5-amino-2,4,6-triiodo-N-lower alkylisophthalamic acids by the action of various acylating agents. For example, the following compounds may be prepared.

(1) 5-acetamido-2,4,6-triiodo-N-propylisophthalamic acid
(2) 5-formamido-2,4,6-triiodo-N-methylisophthalamic acid
(3) 5-formamido-2,4,6-triiodo-N-ethylisophthalamic acid
(4) 5-formamido-2,4,6-triiodo-N-propylisophthalamic acid
(5) 5-propionamido-2,4,6-triiodo-N-ethylisophthalamic acid
(6) 5-propionamido-2,4,6-triiodo-N-propylisophthalamic acid Other 5-lower alkanamido-2,4,6-triiodo-N-lower alkylisophthalamic acids may be prepared by similar methods.

Other lower alkyl esters, such as propyl and butyl esters, of the 5-lower alkanamido-2,4,6-triiodo-N-lower alkylisophthalamic acids may also be prepared by methods similar to those described in Examples 21 and 22 above.

In view of the above, it will be seen that the several objects of the invention are achieved and other advantageous results attained.

As many changes could be made in the above products and methods without departing from the scope of the invention, it is intended that all matter contained in the above description shall be interpreted as illustrative and not in a limiting sense.

I claim:

1. A compound selected from the group consisting of 5-acetamido-N-alkyl-2,4,6-triiodoisophthalamic acids of the formula:

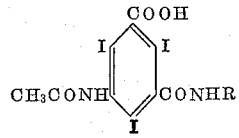

wherein R is selected from the group consisting of methyl and ethyl groups, lower alkyl esters thereof, and salts thereof with pharmaceutically acceptable cations.

2. 5-acetamido-2,4,6-triiodo-N-methylisophthalamic acid.

3. 5-acetamido-2,4,6-triiodo-N-methylisophthalamic acid, sodium salt.

4. 5-acetamido-2,4,6-triiodo-N-methylisophthalamic acid, N-methylglucamine salt.

5. 5-acetamido-N-ethyl-2,4,6-triiodoisophthalamic acid.

6. 5-acetamido-N-ethyl-2,4,6-triiodoisophthalamic acid, sodium salt.

References Cited in the file of this patent

UNITED STATES PATENTS

| 2,611,786 | Wallingford | Sept. 23, 1952 |
| 2,680,133 | Wallingford | June 1, 1954 |
| 2,708,678 | Papa | May 17, 1955 |
| 2,808,433 | Struve | Oct. 1, 1957 |
| 2,813,118 | Galler | Nov. 12, 1957 |
| 2,820,814 | Ginsberg | Jan. 21, 1958 |

FOREIGN PATENTS

| 1,172,953 | France | Feb. 18, 1959 |
| 820,661 | Great Britain | Sept. 23, 1959 |